United States Patent
Kida (10) Patent No.: US 9,630,599 B2
(45) Date of Patent: Apr. 25, 2017

(54) DRIVING ASSISTANCE APPARATUS (71) Applicant: TOYOTA JIDOSHA KABUSHIKI KAISHA, Toyota-shi (JP)

(72) Inventor: Akihiro Kida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/915,003

(22) PCT Filed: Aug. 20, 2014

(86) PCT No.: PCT/IB2014/001555
§ 371 (c)(1),
(2) Date: Feb. 26, 2016

(87) PCT Pub. No.: WO2015/028859
PCT Pub. Date: Mar. 5, 2015

(65) Prior Publication Data
US 2016/0207509 A1 Jul. 21, 2016

(30) Foreign Application Priority Data

Aug. 27, 2013 (JP) ................................ 2013-175857

(51) Int. Cl.
*B60T 7/22* (2006.01)
*G08G 1/16* (2006.01)
(Continued)

(52) U.S. Cl.
CPC .............. *B60T 7/22* (2013.01); *B60W 10/06* (2013.01); *B60W 10/184* (2013.01); *B60W 30/09* (2013.01); *G08G 1/166* (2013.01); *B60W 2540/18* (2013.01); *B60W 2710/083* (2013.01); *B60W 2710/182* (2013.01)

(58) Field of Classification Search
CPC ....... B60T 7/22; B60W 10/184; B60W 30/09; B60W 10/06; B60W 2710/182; B60W 2540/18; B60W 2710/083; G08G 1/166
See application file for complete search history.

(56) References Cited

U.S. PATENT DOCUMENTS

2007/0294019 A1 12/2007 Nishira et al.

FOREIGN PATENT DOCUMENTS

| JP | 11-023706 A | 1/1999 |
|----|-------------|--------|
| JP | 11-255089 A | 9/1999 |

(Continued)

OTHER PUBLICATIONS

Wikipedia article, Anti-Lock Brakes, printed Aug. 18, 2016.*

(Continued)

*Primary Examiner* — Redhwan K Mawari
*Assistant Examiner* — Alan D Hutchinson
(74) *Attorney, Agent, or Firm* — Oblon, McClelland, Maier & Neustadt, L.L.P.

(57) ABSTRACT

A driving assistance apparatus includes an obstacle detecting unit configured to detect an obstacle and acquire obstacle information including a distance to the obstacle; and a control unit configured to intervene to control at least one of braking force and driving force on the basis of the distance to the obstacle, based on the obstacle information, and a running resistance that occurs in response to steering operated by a driver.

10 Claims, 5 Drawing Sheets

(51) Int. Cl.
*B60W 10/06* (2006.01)
*B60W 10/184* (2012.01)
*B60W 30/09* (2012.01)

(56) References Cited

FOREIGN PATENT DOCUMENTS

| | | |
|---|---|---|
| JP | 2002-274344 A | 9/2002 |
| JP | 2005-168081 A | 6/2005 |
| JP | 2006-250927 A | 9/2006 |
| JP | 2007-145315 A | 6/2007 |
| JP | 2007-245871 A | 9/2007 |

OTHER PUBLICATIONS

Machine Translation of JP 2005-168081, printed Aug. 17, 2016.*
Machine Translation of JP 2007-345871, printed Aug. 17, 2016.*
International Search Report Issued Dec. 11, 2014 in PCT/IB14/01555 Filed Aug. 20, 2014.

* cited by examiner

DRIVING ASSISTANCE APPARATUS

BACKGROUND OF THE INVENTION

1. Field of the Invention

The invention relates to a driving assistance technique.

2. Description of Related Art

There is known a driving assistance apparatus that includes obstacle detecting means (for example, an ultrasonic sensor, a millimeter wave radar, or the like) for detecting an obstacle around a vehicle and that avoids a collision by executing automatic braking control irrespective of driver's operation, for example, when a distance to the obstacle is shorter than or equal to a predetermined distance.

In the driving assistance apparatus, if the vehicle turns in a state where there is an obstacle around the host vehicle, the driving assistance apparatus may erroneously recognize that there is an obstacle in a traveling direction although there is no obstacle in the traveling direction, and may execute the above-described automatic braking control for avoiding a collision. For example, there is a case where, at the time when the vehicle makes a U-turn while moving close to a wall at the side of a road, the driving assistance apparatus may execute automatic braking control because the distance between the wall and the host vehicle becomes shorter than or equal to the predetermined distance although there is no wall in the traveling direction.

Automatic braking control in this case is unnecessary for the driver; on the contrary, there is a concern that the driver experiences a feeling of strangeness. Therefore, there is suggested a technique for not activating automatic braking control at a predetermined steering angle or larger (for example, Japanese Patent Application Publication No. 2007-145315 (JP 2007-145315 A)).

However, if automatic braking control is not activated uniformly at the predetermined steering angle or larger, there may occur an inconvenience. For example, this is the case where the vehicle is parked in a state where a steering wheel is turned, the driver shifts into a shift position intended for a direction opposite to a direction in which the driver intends to start moving the vehicle and then the driver depresses an accelerator, or the case where the driver erroneously depresses the accelerator in mistake for a brake at the time when the driver starts moving the vehicle and then attempts to avoid a collision with an obstacle by operating the steering wheel immediately before the collision. In such cases, it may not be possible to effectively avoid a collision by uniformly not executing automatic braking control at the predetermined steering angle or larger.

SUMMARY OF THE INVENTION

The invention provides a driving assistance apparatus that effectively avoids a collision while reducing a feeling of strangeness experienced by a driver.

An aspect of the invention provides a driving assistance apparatus. The driving assistance apparatus includes an obstacle detecting unit configured to detect an obstacle and acquire obstacle information including a distance to the obstacle; and a control unit configured to intervene to control at least one of braking force and driving force on the basis of the distance to the obstacle, based on the obstacle information, and a running resistance that occurs in response to steering operated by a driver.

According to the above aspect, it is possible to provide the driving assistance apparatus that effectively avoids a collision while reducing a feeling of strangeness experienced by a driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

First Embodiment

Figure 1:
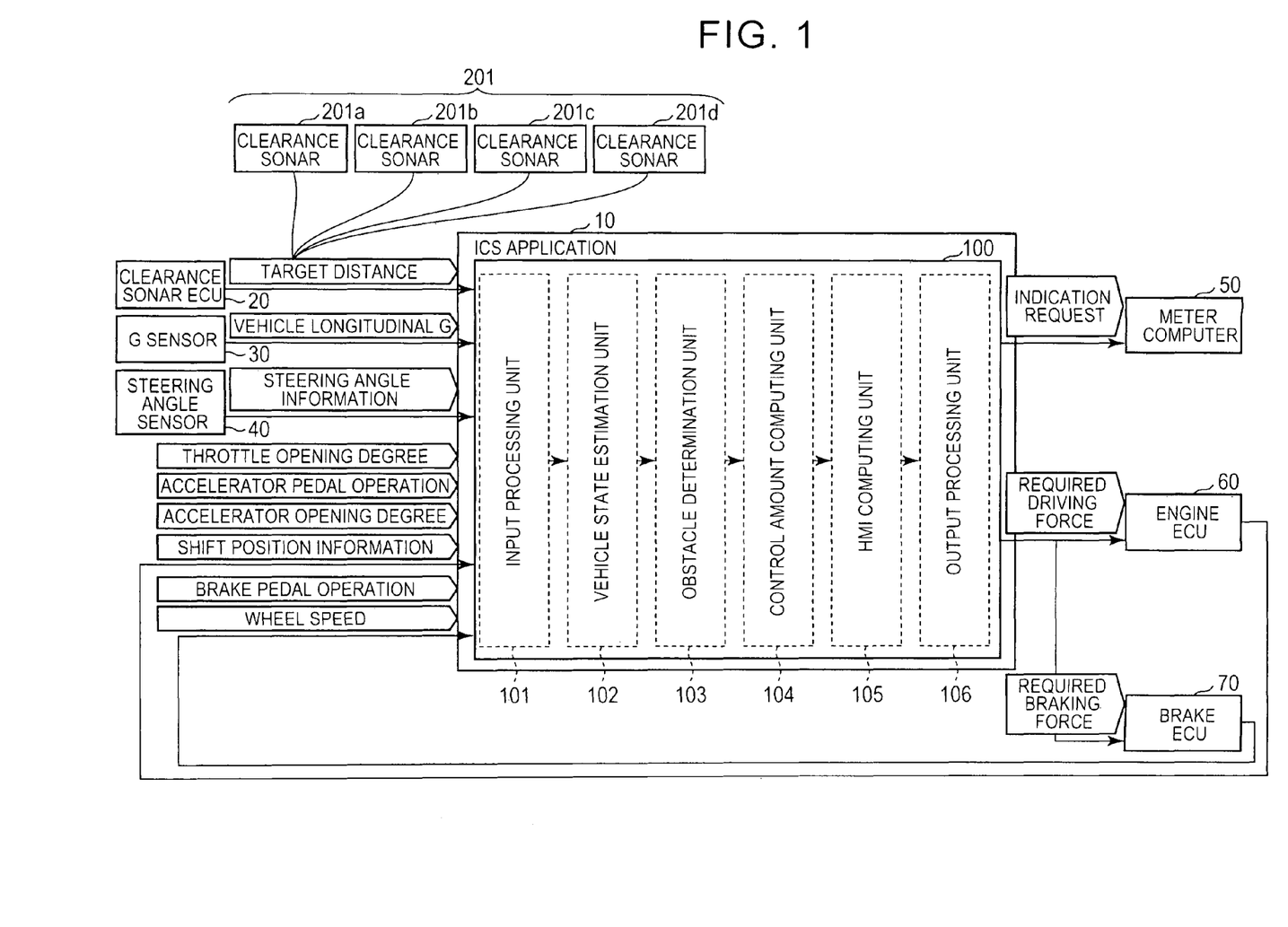
FIG. 1 is a block diagram that shows an example of a system configuration including a driving assistance apparatus according to embodiments of the invention.

FIG. 1 is a block diagram that shows an example of a system configuration including a driving assistance apparatus according to the present embodiment.

As shown in FIG. 1, the driving assistance apparatus includes a driving assistance ECU 10.

The driving assistance ECU 10 is formed of a microcomputer, and includes, for example, a ROM, a readable/rewritable RAM, a timer, a counter, an input interface, an output interface, and the like. The ROM stores control programs. The RAM stores computed results, and the like. The function of the driving assistance ECU 10 may be implemented by any one of hardware, software and firmware or a combination of any two or more of them. For example, selected part or all of the function of the driving assistance ECU 10 may be implemented by an application-specific integrated circuit (ASIC) or a field programmable gate array (FPGA). Part or all of the function of the driving assistance ECU 10 may be implemented by another ECU (for example, a clearance sonar ECU 20). The driving assistance ECU 10 may be configured to implement part or all of the function of another ECU (for example, the clearance sonar ECU 20).

The clearance sonar ECU 20, clearance sonars 201a, 201b, 201c, 201d, a G sensor 30, a steering angle sensor 40, a meter computer 50, an engine ECU 60, a brake ECU 70, and the like, may be connected to the driving assistance ECU 10. For example, the driving assistance ECU 10 may be communicably connected to the clearance sonar ECU 20, the G sensor 30, the steering angle sensor 40, the meter computer 50, the engine ECU 60 and the brake ECU 70 via an in-vehicle LAN, such as a controller area network (CAN), direct wires, or the like.

Each of the clearance sonars 201a, 201b, 201c, 201d is an ultrasonic sensor, and is provided at an appropriate location of a vehicle body. Each of the clearance sonars 201a, 201b, 201c, 201d is an example of a sensor that detects the presence or absence of an obstacle, having a relatively close detection distance of, for example, several centimeters to several meters, or a distance to the obstacle. For example, the two clearance sonars 201a, 201b may be provided at a front bumper, and the two clearance sonars 201c, 201d may be provided at a rear bumper. The number and arrangement of the sensors are not limited to these configurations. For example, sensors may be provided such that four sensors are provided at the front, four sensors are provided at the rear and two sensors are further provided at the sides. Each of the clearance sonars 201a to 201d outputs a detected result (obstacle information) within a corresponding one of detection ranges to the clearance sonar ECU 20.

Each of the clearance sonars 201a, 201b, 201c, 201d may be configured to operate when a vehicle speed falls within a low-speed range higher than 0. The clearance sonars 201a, 201b for detecting an obstacle ahead of the vehicle may be configured to operate at the time when the vehicle travels in accordance with a forward drive range (for example, D range). The clearance sonars 201c, 201d for detecting an obstacle behind the vehicle may be configured to operate at the time when the vehicle travels in accordance with a reverse range (at the time when the vehicle travels backward).

The clearance sonar ECU 20 processes the detected result input from each of the clearance sonars 201a to 201d, and calculates a "target distance" that is a distance to an obstacle. The clearance sonar ECU 20 transmits information about the calculated target distance (distance information) to the driving assistance ECU 10. For example, the clearance sonar ECU 20 may measure a distance to an obstacle by measuring a time that is taken for an ultrasonic wave irradiated from any one of the clearance sonars to reflect from the obstacle and return to the any one of the clearance sonars as the reflected wave. When the detection angle of each clearance sonar is a wide range of, for example, 90°, the direction of an obstacle is not identified only on the basis of the detected result from a single clearance sonar. In this case, for example, the clearance sonar ECU 20 may identify the location (direction) of an obstacle by obtaining distances from the plurality of clearance sonars to the obstacle. The clearance sonar ECU 20 may determine the shape of an obstacle (for example, a shape like a wall or a shape like a utility pole).

The G sensor 30 measures the longitudinal acceleration of the vehicle, and transmits the measured result to the driving assistance ECU 10 as information about "vehicle longitudinal G". The longitudinal acceleration of the vehicle, which is measured by the G sensor 30, is a resultant value of an acceleration that is calculated from a wheel speed and an acceleration of gravity due to the gradient of a road (the inclination of the vehicle). Thus, it is possible to measure the gradient of a road by subtracting an acceleration, which is calculated from a wheel speed, from the vehicle-longitudinal G that is measured by the G sensor 30.

The steering angle sensor 40 detects the steering angle of a steering wheel, and transmits the steering angle to the driving assistance ECU 10 as steering angle information.

A combination meter instrument (not shown) that informs a driver by indication, an information sound generating device (not shown) that informs the driver by voice, or the like, is connected to the meter computer 50. The meter computer 50 controls numeric values, characters, graphics, indicator lamps, and the like, that are displayed on the combination meter instrument in response to a request from the driving assistance ECU 10, and controls alarm sound or alarm voice that is issued from the information sound generating device.

The engine ECU 60 is to control the operation of an engine that is a driving source for the vehicle, and controls, for example, ignition timing, fuel injection amount, throttle opening degree, and the like. The engine ECU 60 controls engine output on the basis of a required driving force from the driving assistance ECU 10 (described later). In the case of a hybrid vehicle, the engine ECU 60 may control (suppress) driving force in response to the required driving force from the driving assistance ECU 10 in cooperation with an HVECU (not shown) that controls an overall hybrid system. In the case of a hybrid vehicle or an electric vehicle, motor output may be controlled on the basis of a required driving force from the driving assistance ECU 10.

The engine ECU 60 may transmit information about accelerator pedal operation, information about accelerator opening degree, information about throttle valve opening degree and shift position information to the driving assistance ECU 10. The information about accelerator pedal operation indicates the operation amount of the accelerator pedal (not shown). The information about accelerator opening degree indicates the accelerator opening degree. The information about throttle valve opening degree indicates the throttle opening degree. The shift position information indicates the position of a shift lever, and is P (parking), R (reverse), N (neutral), D (drive), or the like. The shift position information may include, for example, a drive mode, such as a sporty mode and a snow mode, a status of use of adaptive cruise control (ACC), or the like. The information about accelerator pedal operation may be directly acquired from an accelerator position sensor. The information about throttle valve opening degree may be directly acquired from a throttle sensor provided in a throttle body. The shift position information may be acquired from an ECU that controls a transmission or may be directly acquired from a shift position sensor.

The brake ECU 70 is to control a braking system of the vehicle, and controls, for example, a brake actuator that actuates a hydraulic brake device arranged in each wheel (not shown). The brake ECU 70 controls the output of the brake actuator (wheel cylinder pressure) on the basis of a required braking force from the driving assistance ECU 10 (described later). The brake actuator may include a pump that generates a high-pressure oil (and a motor that drives the pump), various valves, and the like. Any hydraulic circuit configuration of the braking system may be employed. The hydraulic circuit of the braking system just needs to be configured to be able to increase each wheel cylinder pressure irrespective of the driver's depression amount of the brake pedal. Typically, the hydraulic circuit may include a high-pressure hydraulic source (a pump or an accumulator that generates high-pressure oil) other than a master cylinder. A circuit configuration that is typically used in a brake-by-wire system that is represented by an electric control brake system (ECB) may be employed. In the case of a hybrid vehicle or an electric vehicle, motor output (regenerative operation) may be controlled on the basis of a required braking force from the driving assistance ECU 10.

The brake ECU 70 may transmit information about brake pedal operation and information about wheel speed to the driving assistance ECU 10. The information about wheel speed may be, for example, based on a signal from a wheel speed sensor provided at each wheel (not shown). The speed or acceleration (or deceleration) of the vehicle (vehicle body speed) is allowed to be calculated from the information about wheel speed. The information about brake pedal operation may be directly acquired from a brake depression force switch or a master cylinder pressure sensor. Similarly, the information about wheel speed (or information about vehicle speed) may be directly acquired from a wheel speed sensor, a drive shaft rotation sensor, or the like.

The driving assistance ECU 10 includes an intelligent clearance sonar (ICS) application 100. In the example shown in FIG. 1, the ICS application 100 is software that runs in the driving assistance ECU 10, and includes an input processing unit 101, a vehicle state estimation unit 102, an obstacle determination unit 103, a control amount computing unit 104, a human machine interface (HMI) computing unit 105 and an output processing unit 106.

The driving assistance ECU 10 carries out driving assistance such that the host vehicle does not collide with an obstacle on the basis of, for example, information from the clearance sonar ECU 20. The driving assistance may include an alarm that prompts driver's autonomous brake operation (in cooperation with the meter computer 50), intervening to suppress driving force (in cooperation with the engine ECU 60) and intervening to generate braking force (in cooperation with the brake ECU 70). The details of the driving assistance according to the present embodiment will be described later.

The input processing unit 101 executes the process of inputting various pieces of information, which are received by the driving assistance ECU 10. For example, information that is received in conformity with the CAN communication standard is converted to information that is usable in the ICS application 100. The distance information from the clearance sonar ECU 20, the information about the vehicle longitudinal G from the G sensor 30, and the steering angle information from the steering angle sensor 40 are input from the input processing unit 101 The information about accelerator pedal operation, the information about accelerator opening degree, the information about throttle valve opening degree and the shift position information are input from the engine ECU 60 to the input processing unit 101. The information about brake pedal operation and the information about wheel speed are input from the brake ECU 70.

The vehicle state estimation unit 102 includes the function of estimating a vehicle state on the basis of the above-described various pieces of information, input to the input processing unit 101. For example, the vehicle state estimation unit 102 may determine whether a vehicle state in which the clearance sonars 201*a* to 201*d* should operate has been established.

The obstacle determination unit 103 carries out collision determination on an obstacle detected by the clearance sonars 201*a* to 201*d* on the basis of, for example, obstacle information associated with the obstacle. Specifically, the obstacle determination unit 103 determines whether there is a high possibility of a collision of the detected obstacle with the host vehicle (whether a collision with the obstacle should be avoided by driving assistance). For example, the obstacle determination unit 103 may determine that the host vehicle collides with the obstacle when a deceleration required to avoid a collision with the obstacle (required deceleration) is higher than a predetermined threshold TH on the basis of the obstacle information about the obstacle, detected by the clearance sonars 201*a* to 201*d*, the steering angle information received from the steering angle sensor 40, the wheel speed information received from the brake ECU 70, and the like. A specific method of calculating the required deceleration and collision determination will be described later.

The control amount computing unit 104 computes a control amount in driving assistance. For example, when the obstacle determination unit 103 has determined that the host vehicle collides with the obstacle, a required braking force based on the above-described required deceleration is computed. The control amount computing unit 104 computes a required driving force for suppressing driving force when the detected obstacle is located within a predetermined distance.

The HMI computing unit 105 is a computing unit for outputting various pieces of information for reminding the driver of the obstacle when an intended obstacle is detected. The HMI computing unit 105, for example, carries out computation for providing notification by a display device, an audio device, a vibration device, or the like (not shown), to the driver through the meter computer 50.

The output processing unit 106, for example, converts computed results to signals conforming with the CAN communication standard and outputs the signals in order to transmit the control amounts (the required driving force and the required braking force) computed by the control amount computing unit 104 and the computed result (output information) computed by the HMI computing unit 105 to the engine ECU 60, the brake ECU 70 and the meter computer 50.

Next, a driving assistance flowchart that is executed by the driving assistance apparatus 1 according to the present embodiment, that is, a flowchart from a collision determination that is carried out by the obstacle determination unit 103 by using the required deceleration for avoiding a collision with the obstacle to interventional braking control, will be described.

Figure 2:
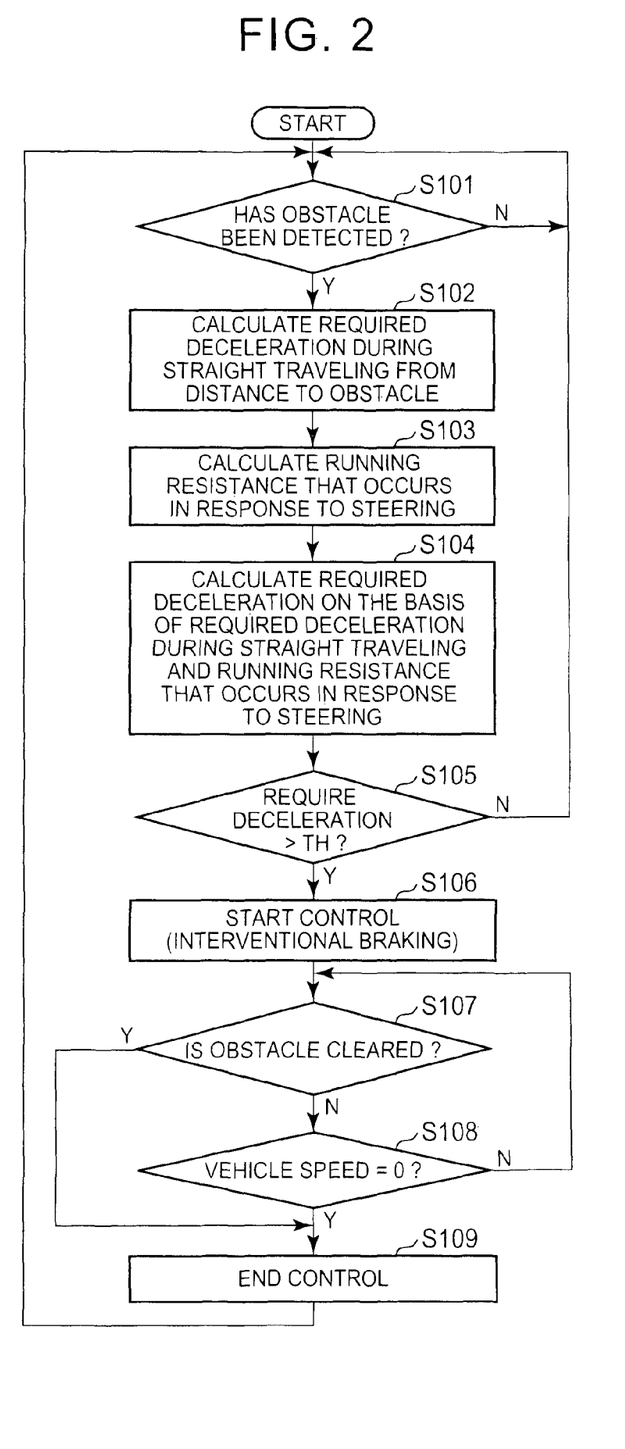
FIG. 2 is a flowchart that illustrates the operation of the driving assistance apparatus according to a first embodiment of the invention.

FIG. 2 is a flowchart that illustrates the operation of the driving assistance apparatus 1. The routine shown in FIG. 2 may be started from when the ignition of the vehicle on which the driving assistance apparatus 1 is mounted is turned on and may be executed while the ignition is on. The driving assistance that is carried out by the driving assistance apparatus 1 is allowed to be cancelled by the driver. When the cancellation operation is conducted by the driver, the routine shown in FIG. 2 may be ended. The driving assistance that is carried out by the driving assistance apparatus 1 may be started by the driver through starting operation. In this case, the routine shown in FIG. 2 may be started through the starting operation. The "driving assistance" in the present embodiment may include not only intervening to control braking force or driving force in order to avoid a collision with the above-described obstacle but also, for example, a state of monitoring an obstacle around the host vehicle as shown in step S101 (described later).

In step S101, the driving assistance ECU 10 (obstacle determination unit 103) determines whether an obstacle has been detected by the clearance sonars 201*a* to 201*d*. When the obstacle has been detected, the process proceeds to step S102. When no obstacle has been detected, determination as to step S101 is repeated until an obstacle has been detected. In step S101, the obstacle may be detected, and it may be determined whether a distance from the obstacle is shorter than or equal to a predetermined distance (the host vehicle is close to the obstacle to some extent).

In step S102, the driving assistance ECU 10 (obstacle determination unit 103) calculates a required deceleration during straight traveling from, for example, a distance to the detected obstacle (the target distance received from the clearance sonar ECU 20). For example, when it is assumed that the host vehicle is traveling straight ahead on the basis of the distance to the obstacle, the speed of the host vehicle, a road surface condition (the slipperiness of a road surface) and a road surface gradient, the required deceleration for avoiding a collision with the detected obstacle is calculated. The correlation between a distance to an obstacle, a speed of the host vehicle, a road surface condition (for example, a slip ratio), a road surface gradient, and the like, and a required deceleration may be stored in advance in the ROM, or the like, of the driving assistance ECU 10 as a relational expression, a map, or the like, on the basis of an experiment, or the like, and the required deceleration may be calculated on the basis of the relational expression or map. The slip ratio is defined by (Vehicle body speed−Wheel speed)/ Vehicle body speed, and may be calculated on the basis of the wheel speed of the drive wheel and the wheel speed of the driven wheel (which is utilized to calculate the vehicle body speed). In the case where all the wheels are drive wheels, the slip ratio may be calculated on the basis of the wheel speed and the integral value of the vehicle longitudinal G (which is utilized to calculate the vehicle body speed). As described above, the road surface gradient may be calculated by subtracting the acceleration, which is calculated on the basis of the wheel speed, from the vehicle longitudinal G measured by the G sensor 30.

In step S103, the driving assistance ECU 10 (obstacle determination unit 103) calculates a running resistance that occurs in response to steering. Lateral force occurs in each of the tires of the steered wheels as a result of steering, and the component of the lateral force in the vehicle traveling direction becomes the running resistance. Even with a change in contact area between the tires of the steered wheels and the road surface as a result of steering, a running resistance larger than that during straight traveling occurs. Thus, in this way, a running resistance that occurs in response to steering, that is, a running resistance that increases as compared to that during straight traveling as a result of steering, is calculated. For example, the running resistance that occurs in response to steering is calculated on the basis of the steering angle, the road surface condition (the slipperiness of the road surface), the road surface gradient, and the like. At this time, the correlation between a steering angle, a road surface condition (for example, a slip ratio), a road surface gradient, and the like, and a running resistance may be stored in advance in the ROM, or the like, of the driving assistance ECU 10 as a relational expression, a map, or the like, on the basis of an experiment, or the like, and the above-described running resistance may be calculated on the basis of the relational expression or the map.

As another example, a running resistance that occurs in response to steering may be calculated on the basis of the speed of the host vehicle, the throttle opening degree (or the accelerator opening degree), the road surface condition (for example, the slip ratio), the road surface gradient, and the like. Even at the same throttle opening degree, the speed of the host vehicle changes (decreases) with an increase in the steering angle because of the running resistance that occurs in response to steering. Thus, the correlation between a speed of the host vehicle, a throttle opening degree, a road surface condition (slip ratio), a road surface gradient, and the like, and a running resistance is stored in advance in the ROM, or the like, of the driving assistance ECU 10 as a relational expression, a map, or the like, on the basis of an experiment, or the like, and the above-described running resistance may be calculated on the basis of the relational expression or the map.

Step S102 and step S103 may be executed in parallel with each other.

In step S104, the driving assistance ECU 10 (obstacle determination unit 103) calculates a required deceleration for avoiding a collision with the obstacle on the basis of the required deceleration during straight traveling, calculated in step S102, and the running resistance that occurs in response to steering, calculated in step S103, Specifically, a required deceleration for avoiding a collision with the obstacle detected in step S101 may be calculated by subtracting a deceleration due to the running resistance from the required deceleration during straight traveling. Thus, it is possible to calculate the required deceleration that also incorporates the running resistance in response to steering. The deceleration due to the running resistance may be calculated on the basis of the running resistance, the weight of the host vehicle, and the like, or the correlation between a running resistance and a deceleration, associated with the host vehicle, is stored in advance in the driving assistance ECU 10, or the like, as a relational expression, a map, or the like, through an experiment, or the like, and then the deceleration may be calculated on the basis of the relational expression or the map. The running resistance that occurs in response to steering increases with an increase in the steering angle. Thus, the required deceleration for avoiding a collision with the obstacle decreases with an increase in the steering angle.

In the example of FIG. 2, the required deceleration during straight traveling and the running resistance that occurs in response to steering are calculated and then the required deceleration for avoiding a collision with the obstacle is calculated. Instead, the required deceleration may be directly calculated on the basis of the distance to the obstacle, the steering angle, and the like. For example, the correlation between a distance to an obstacle, a speed of the host vehicle, a steering angle, a road surface condition (for example, a slip ratio) and a road surface gradient and a required deceleration may be stored in advance in the ROM, or the like, of the driving assistance ECU 10 as a relational expression, a map, or the like, though an experiment, or the like, and the required deceleration may be calculated on the basis of the relational expression, the map, or the like. With this configuration as well, the driving assistance ECU 10 is able to calculate a required deceleration that also incorporates a running resistance that occurs in response to steering.

In step S105, the driving assistance ECU 10 (obstacle determination unit 103) determines whether there is a high possibility of a collision of the obstacle detected in step S101 with the host vehicle (whether a collision with the obstacle should be avoided by driving assistance). That is, the driving assistance ECU 10 (obstacle determination unit 103) determines whether the required deceleration for avoiding a collision with the obstacle, calculated in step S104, is higher than the predetermined threshold TH. When the required deceleration is higher than the predetermined threshold TH, it is determined that there is a high possibility that it is not possible to avoid the obstacle at the deceleration that is generated by driver's brake operation, that is, there is a high possibility of a collision of the obstacle with the host vehicle.

In step S105, when the required deceleration for avoiding a collision with the obstacle, calculated in step S104, is lower than or equal to the predetermined threshold TH, it is determined that there is a low possibility of a collision of the obstacle with the host vehicle, the process returns to step S101, and the flowchart of step S102 to step S105 is executed again on an obstacle detected the next time. The obstacle detected the next time is not limited to another obstacle, and, for example, includes the case where the same obstacle has been detected at a distance closer to the host vehicle than the last time.

In step S105, when the required deceleration for avoiding a collision with the obstacle, calculated in step S104, is higher than the predetermined threshold TH, it is determined that there is a high possibility of a collision of the detected obstacle with the host vehicle, and the process proceeds to step S106.

In step S106, the driving assistance ECU 10 (control amount computing unit 104, output processing unit 106) starts interventional braking control for avoiding a collision with the obstacle. Initially, the control amount computing unit 104 computes a required braking force based on the required deceleration calculated in step S104. The output processing unit 106 transmits the required braking force to the brake ECU 70. The brake ECU 70 controls the brake actuator in response to the received required braking force. In this way, the driving assistance ECU 10 executes interventional braking control via the brake ECU 70. Thus, it is possible to avoid a collision with the obstacle detected in step S101.

Interventional braking control started in step S106 is continuously executed except that the obstacle detected in step S101 is cleared (not detected anymore) or the host vehicle has stopped through interventional braking control. That is, the driving assistance ECU 10 determines in step S107 whether the obstacle is cleared, and the driving assistance ECU 10 determines in step S108 whether the host vehicle has stopped (whether the vehicle speed is 0).

When it is determined in step S107 that the obstacle is not cleared and it is determined in step S108 that the host vehicle has not stopped, the interventional braking control started in step S106 is continuously executed.

When it is determined in step S107 that the obstacle is cleared or when it is determined in step S108 that the host vehicle has stopped, the process proceeds to step S109.

In step S109, interventional braking control is ended, and the process returns to step S101.

In this way, each time an obstacle is detected, step S101 to step S109 are repeated, and the driving assistance ECU 10 carries out driving assistance (monitoring of the obstacle, interventional braking control, and the like).

The reason why interventional braking control is ended in the case where it is determined in step S108 that the host vehicle has stopped is, for example, that the vehicle is allowed to start moving on the basis of driver's intention even when the vehicle stops in a railroad crossing, a crossing bar moves down and the crossing bar is recognized as an obstacle.

Figure 3:
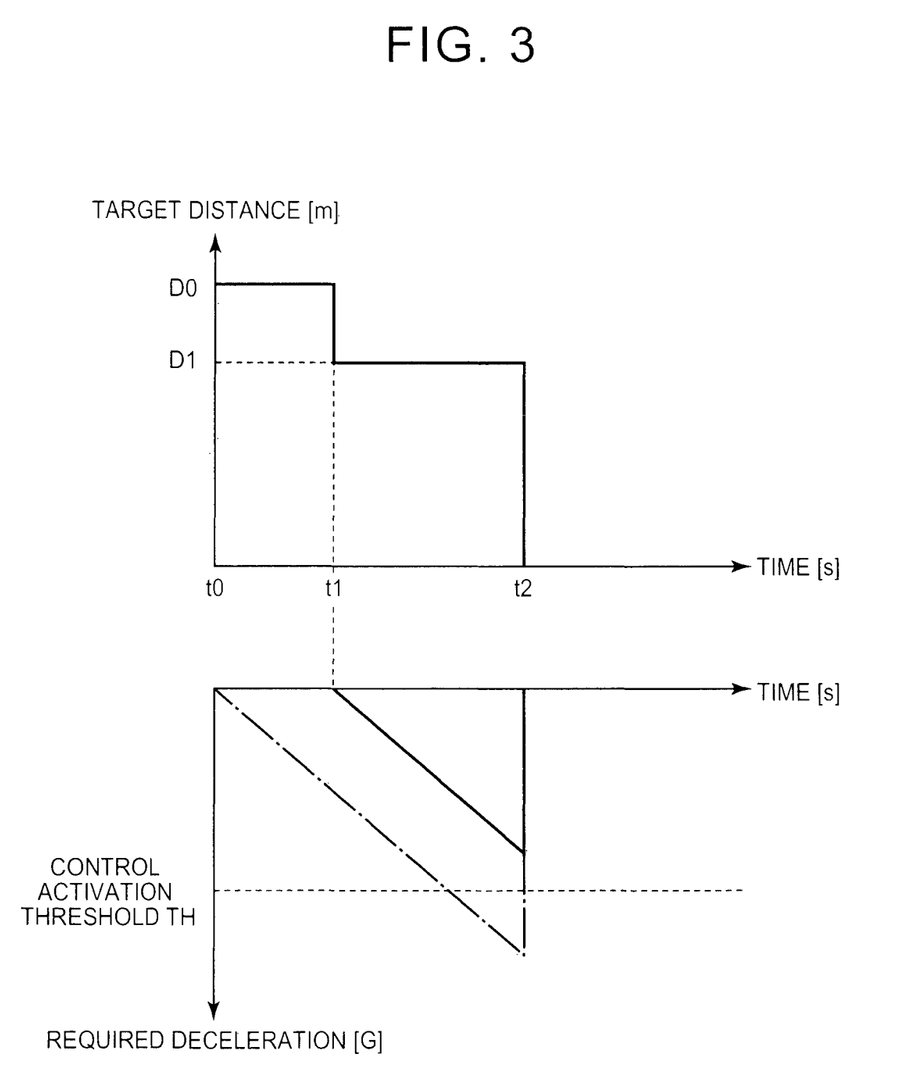
FIG. 3 is a time chart that illustrates an example of the operation of the driving assistance apparatus according to the first embodiment.

Next, an example of the operation of the driving assistance apparatus 1 according to the present embodiment will be described with reference to the time chart.

FIG. 3 is a time chart that illustrates an example of the operation of the driving assistance apparatus 1.

The top chart shows a temporal change in distance from an obstacle from time t0 in the case where the obstacle has been detected at time t0, where the ordinate axis represents target distance (distance from the obstacle) and the abscissa axis represents time. The bottom chart shows a temporal change in required deceleration from time t0, corresponding to the top chart, where the ordinate axis represents required deceleration and the abscissa axis represents time. The ordinate axis for the required deceleration is oriented downward, and the required deceleration increases toward the lower side. The bottom chart shows not only the required deceleration (continuous line) calculated by the driving assistance ECU 10 (obstacle determination unit 103) according to the present embodiment but also the required deceleration in the case where a running resistance due to steering is not considered for comparison, that is, the required deceleration (alternate long and short dashed line) during straight traveling. In this example, it is assumed that the steering wheel is steered by the driver (the steering wheel is kept at a certain steering angle).

As shown in FIG. 3, in the top chart, an obstacle is detected at a distance D0 at time t0. After that, the obstacle is detected at a distance D1 closer to the host vehicle than the distance D0 at time t1, and the distance between the host vehicle and the obstacle is approaching. After that, the obstacle is not detected anymore at time t2.

In the bottom chart corresponding to the top chart, when a running resistance due to steering is not considered, the required deceleration begins to be calculated as a significant value from the timing at which the obstacle has been detected at time t0. After that, the required deceleration increases as the obstacle approaches in the period from time t0 to time t2, and exceeds the predetermined threshold TH in the period between time t1 and time t2. At or above the predetermined threshold TH, the obstacle determination unit 103 determines that there is a high possibility of a collision of the obstacle with the host vehicle. Thus, the driving assistance ECU 10 starts interventional braking control, with the result that braking force is generated irrespective of driver's operation. After that, because the obstacle is not detected anymore at time t2, the required deceleration becomes lower than or equal to the predetermined threshold TH, so interventional braking control is completed at time t2. In this way, when a running resistance due to steering is not considered, there is a concern that interventional braking control is started, for example, when an obstacle has been temporarily detected (for example, when the vehicle temporarily moves close to a wall at the side of a road for a U-turn). Thus, the driver may experience a feeling of strangeness or a discomfort because of interventional braking control not intended by the driver is executed.

In contrast, the required deceleration calculated by the driving assistance ECU 10 in the present embodiment is not calculated as a significant value (that is, calculated as 0) in the period from time t0 to time t1, and begins to be calculated as a significant value from time t1 at which the vehicle has approached the obstacle. This is because (a deceleration due to) a running resistance that occurs in response to steering is considered and, therefore, the required deceleration is lower than that in the case where the steering angle is not considered. After that, the required deceleration increases in the period from time t1 to time t2; however, the obstacle is not detected anymore at time t2, so the required deceleration does not exceed the predetermined threshold TH and the required deceleration becomes 0. When a running resistance that occurs in response to steering is considered as in the case of the present embodiment, the required deceleration for avoiding a collision with the obstacle decreases as compared to the case where the running resistance is not considered. Thus, it is possible to extend a time until the required deceleration exceeds the predetermined threshold TH, so it is possible not to execute interventional braking control not intended by the driver because of a temporarily detected obstacle as in the case of this example. In this example, the obstacle is not detected anymore at time t2; however, the obstacle can be continuously detected at time t2 or later. In this case, it is assumed that the required deceleration exceeds the predetermined threshold TH and interventional braking control is started.

However, in this case as well, the timing at which the required deceleration exceeds the predetermined threshold TH, that is, the timing at which interventional braking control is started, is delayed as compared to the case where the running resistance based on steering is not considered, so it is possible to reduce a feeling of strangeness experienced by the driver. In the interventional braking control in the present embodiment, the required deceleration is calculated on the basis of the running resistance that occurs in response to steering, so the control start timing delays; however, it is possible to avoid a collision with the obstacle with braking force generated through interventional control and stop the host vehicle. That is, it is possible to effectively avoid a collision.

As described above, the driving assistance ECU 10 (control amount computing unit 104) suppresses driving force when the detected obstacle is located within the predetermined distance, and may consider the running resistance that occurs in response to steering at the time of calculating a suppressed driving force. That is, with an increase in the running resistance that occurs in response to steering, the timing at which interventional control (suppression) of driving force is started may be delayed as in the case of the above-described required deceleration. For example, the predetermined distance may be changed such that the predetermined distance decreases with an increase in the running resistance that occurs in response to steering. The amount of interventional suppression of driving force may be reduced as in the case of the above-described required deceleration with an increase in the running resistance that occurs in response to steering. With these configurations, it is possible to reduce a feeling of strangeness experienced by the driver as a result of interventional suppression of driving force.

Second Embodiment

Next, a second embodiment will be described.

The driving assistance apparatus 1 according to the present embodiment mainly differs from that of the first embodiment in that driving force is suppressed when an obstacle has been detected and the amount of suppression of driving force is reduced as the steering angle increases. Hereinafter, like reference numerals denote similar component elements to those of the first embodiment, and different portions will be mainly described.

The system configuration of the driving assistance apparatus 1 according to the present embodiment is shown in FIG. 1 as in the case of the first embodiment.

The control amount computing unit 104 computes a control amount in driving assistance. For example, when the obstacle determination unit 103 has determined that the host vehicle collides with the obstacle, a required braking force based on the above-described required deceleration is computed. The control amount computing unit 104 computes a driving force suppressed as a required driving force (hereinafter, referred to as suppressed driving force) when an obstacle has been detected by the clearance sonars 201a to 201d. The suppressed driving force may be calculated from a distance to the obstacle (a target distance received from the clearance sonar ECU 20), a speed of the host vehicle (calculated on the basis of a wheel speed received from the engine ECU 60), a steering angle received from the steering angle sensor 40, a road surface condition (the slipperiness of a road surface), a road surface gradient, and the like. The details will be described later.

Next, a driving assistance flowchart that is executed by the driving assistance apparatus 1 according to the present embodiment, that is, a flowchart from detection of an obstacle by the clearance sonars 201a to 201d to intervening driving force suppression control, will be described.

Figure 4:
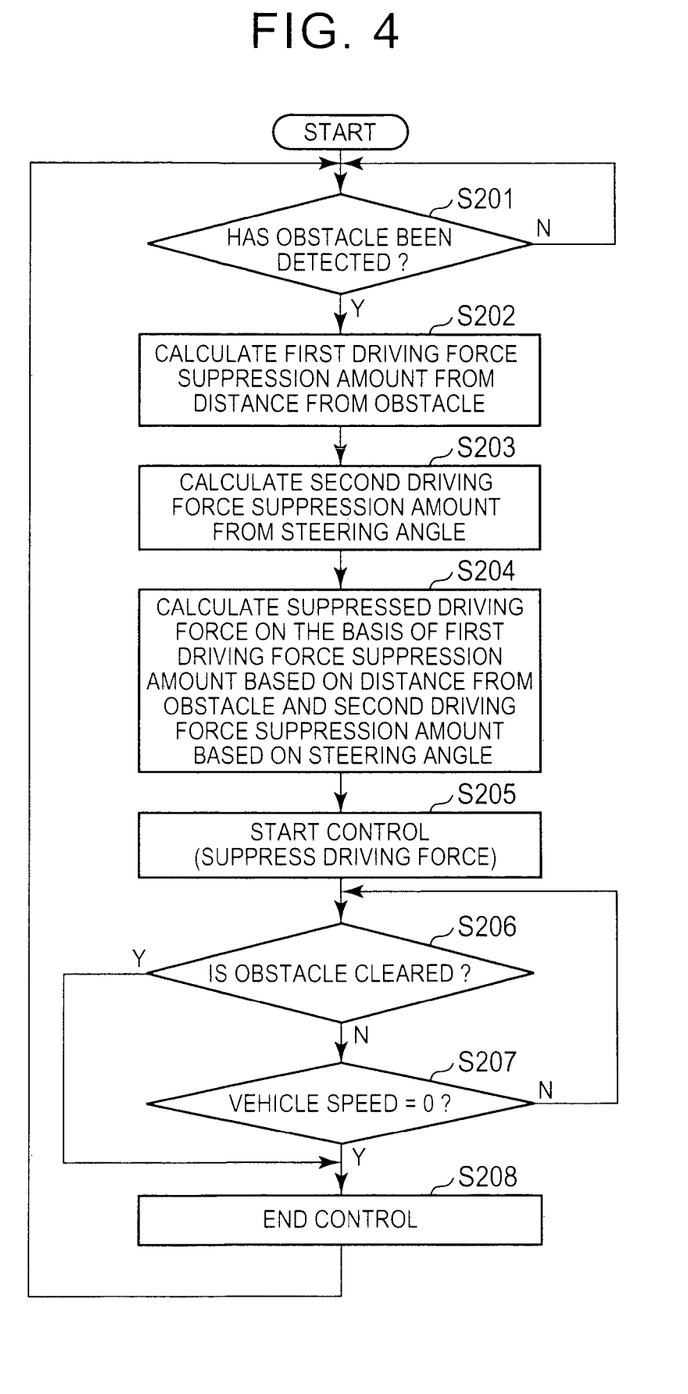
FIG. 4 is a flowchart that illustrates the operation of a driving assistance apparatus according to a second embodiment of the invention.

FIG. 4 is a flowchart that illustrates the operation of the driving assistance apparatus 1. The routine shown in FIG. 4 may be started from when the ignition of the vehicle on which the driving assistance apparatus 1 is mounted is turned on and may be executed while the ignition is on. The driving assistance that is carried out by the driving assistance apparatus 1 is allowed to be cancelled by the driver. When the cancellation operation is conducted by the driver, the routine shown in FIG. 4 may be ended. The driving assistance that is carried out by the driving assistance apparatus 1 may be started by the driver through starting operation. In this case, the routine shown in FIG. 4 may be started through the starting operation. The "driving assistance" in the present embodiment may include not only intervening to control braking force or driving force in order to avoid a collision with the above-described obstacle but also, for example, a state of monitoring an obstacle around the host vehicle as shown in step S201 (described later). The driving assistance flowchart shown in FIG. 2 and described in the first embodiment is executed in parallel with the driving assistance flowchart shown in FIG. 4.

In step S201, the driving assistance ECU 10 (obstacle determination unit 103) determines whether an obstacle has been detected by the clearance sonars 201a to 201d. When the obstacle has been detected, the process proceeds to step S202. When no obstacle has been detected, determination as to step S201 is repeated until an obstacle has been detected.

In step S202, the driving assistance ECU 10 (control amount computing unit 104) calculates a first driving force suppression amount based on the distance from the obstacle. Specifically, the correlation between a distance to an obstacle, a speed of the host vehicle, a road surface condition (for example, a slip ratio), a road surface gradient, and the like, and a first driving force suppression amount may be stored in advance in the ROM, or the like, of the driving assistance ECU 10 as a relational expression, a map, or the like, on the basis of an experiment, or the like, and the first driving force suppression amount may be calculated on the basis of the relational expression or map. For example, the relational expression or the map may be configured such that the first driving force suppression amount is increased as the distance from the obstacle decreases. The first driving force suppression amount may be increased as the speed of the host vehicle increases. The first driving force suppression amount may be increased as the slip ratio increases (as the road surface becomes more slippery). The first driving force suppression amount may be increased as the gradient of the road surface increases on a down grade. The first driving force suppression amount may be reduced as the gradient of the road surface increases on an up grade. With these configuration, it is possible to suppress driving force so as to avoid a collision with the obstacle in step S205 (described later).

In step S203, the driving assistance ECU 10 (control amount computing unit 104) calculates a second driving force suppression amount based on steering. Specifically, the second driving force suppression amount is increased with an increase in the steering angle received from the steering angle sensor 40. The second driving force suppression amount may be continuously increased or increased in a stepwise manner with an increase in the steering angle. The correlation between a steering angle and a second driving force suppression amount may be stored in advance in the ROM, or the like, of the driving assistance ECU 10 as a relational expression, a map, or the like, and the second driving force suppression amount may be calculated on the basis of the relational expression, the map, or the like.

Step S202 and step S203 may be executed in parallel with each other.

In step S204, the driving assistance ECU 10 (control amount computing unit 104) calculates a suppressed driving force as the required driving force on the basis of the first driving force suppression amount calculated in step S202 and the second driving force suppression amount calculated in step S203. Specifically, the suppressed driving force may be calculated by subtracting the first driving force suppression amount and the second driving force suppression amount from the driving force in the case where the engine ECU 60 controls driving force in synchronization with driver's operation of the accelerator pedal. As described above, the second driving force suppression amount is increased with an increase in the steering angle, so the suppressed driving force is reduced with an increase in the steering angle.

An example of the suppressed driving force that is calculated in step S204 will be described.

Figure 5:
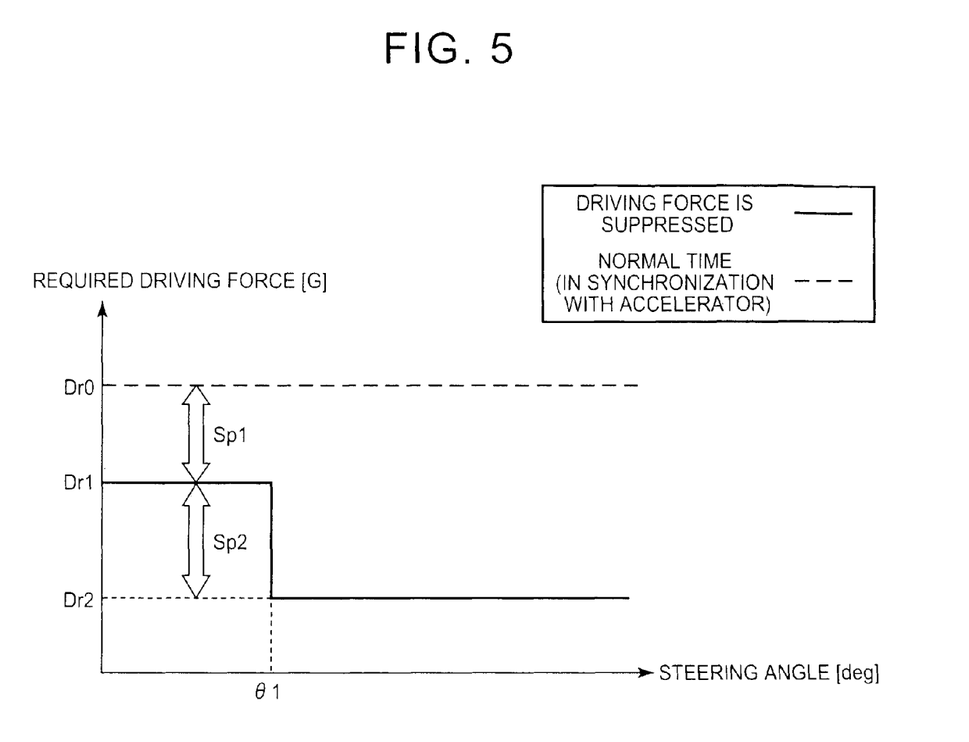
FIG. 5 is a graph that shows an example of the correlation between a suppressed driving force and a steering angle according to the second embodiment.

FIG. 5 is a graph that shows an example of the correlation between a suppressed driving force (as a required driving force) and a steering angle. FIG. 5 shows a change in the required driving force with a change in the steering angle where the ordinate axis represents required driving force and the abscissa axis represents steering angle. In the graph, the dashed line indicates a driving force corresponding to an accelerator opening degree during normal times, that is, a driving force in the case where the engine ECU 60 controls the driving force in synchronization with driver's operation of the accelerator pedal, and the continuous line indicates a suppressed driving force. In the graph, Sp1 corresponds to the first driving force suppression amount, and Sp2 corresponds to the second driving force suppression amount at the steering angle θ1 or larger.

As shown in FIG. 5, the suppressed driving force is Dr1 (<Dr0) obtained by subtracting Sp1, which is the first driving force suppression amount, from Dr0, which is the driving force during normal times indicated by the dashed line, within the range in which the steering angle is smaller than θ1. In the range in which the steering angle is smaller than θ1, the second driving force suppression amount is 0. In the range in which the steering angle is larger than or equal to θ1, the suppressed driving force is Dr2 (<Dr1) obtained by subtracting the first driving force suppression amount Sp1 and the second driving force suppression amount Sp2 from Dr0 that is the driving force during normal times indicated by the dashed line. In this way, the suppressed driving force is reduced in a stepwise manner with an increase in the steering angle. The suppressed driving force may be reduced in a stepwise manner minutely or continuously reduced with an increase in the steering angle.

In the example of FIG. 4, the first driving force suppression amount based on the distance from the obstacle and the second driving force suppression amount based on steering are calculated, and then the suppressed driving force is calculated. Instead, the suppressed driving force may be directly calculated on the basis of the distance from the obstacle, the steering angle, and the like. For example, the correlation between a distance to an obstacle, a speed of the host vehicle, a steering angle, a road surface condition (for example, a slip ratio) and a road surface gradient and a suppressed driving force may be stored in advance in the ROM, or the like, of the driving assistance ECU 10 as a relational expression, a map, or the like, and the suppressed driving force may be calculated on the basis of the relational expression, the map, or the like. In this case as well, the suppressed driving force is calculated on the basis of the relational expression or the map so as to be reduced with an increase in the steering angle.

In step S205, the driving assistance ECU 10 (control amount computing unit 104, output processing unit 106) starts interventional driving force suppression control. The output processing unit 106 transmits the required driving force (suppressed driving force) calculated in step S204 to the engine ECU 60. The engine ECU 60 controls ignition timing, fuel injection amount, throttle opening degree, and the like, on the basis of the received required driving force. In this way, the driving assistance ECU 10 executes interventional driving force suppression control via the engine ECU 60.

Interventional driving force suppression control started in step S205 is continuously executed except that the obstacle detected in step S201 is cleared (not detected anymore) or the host vehicle has stopped through interventional braking control, or the like, executed in parallel. That is, the driving assistance ECU 10 determines in step S206 whether the obstacle is cleared, and the driving assistance ECU 10 determines in step S207 whether the host vehicle has stopped (whether the vehicle speed is 0).

When it is determined in step S206 that the obstacle is not cleared and it is determined in step S207 that the host vehicle has not stopped, the interventional driving force suppression control started in step S205 is continuously executed.

When it is determined in step S206 that the obstacle is cleared or when it is determined in step S207 that the host vehicle has stopped, the process proceeds to step S208.

In step S208, interventional driving force suppression control is ended, and the process returns to step S201.

In this way, each time the obstacle is detected, step S201 to step S208 are repeated, and the driving assistance ECU 10 carries out driving assistance (monitoring of an obstacle, and interventional driving force suppression control).

With the driving force suppression control according to the above-described present embodiment, the required driving force is reduced with an increase in the steering angle. Thus, the speed of the host vehicle is more suppressed with an increase in the steering angle, so it is possible to further delay approach to an obstacle. That is, it is possible to further delay the timing at which interventional braking control executed in parallel is started as compared to the first embodiment. With this configuration, if interventional braking control is started, there is a delay of time till then, so it is possible to reduce a feeling of strangeness experienced by the driver. It is possible to further reliably cause interventional braking control, not intended by the driver, not to start because of a temporarily detected obstacle. For example, even when the accurate location of an obstacle cannot be determined because of diffuse reflection, or the like, of an ultrasonic wave, a time that is taken to determine the accurate location of the obstacle can be ensured because the timing at which interventional braking control is started is delayed. That is, when there is truly a possibility of a collision, it is possible to activate interventional braking control.

Particularly, when the steering angle is large, there is a high possibility that operation to avoid an obstacle has been already conducted by the driver, and there are many cases where an obstacle is temporarily detected by the clearance sonars 201*a* to 201*d* (for example, when the vehicle temporarily approaches a roadside wall at the time of moving close to the wall). Therefore, in such a case, if interventional braking control is started, the driver experiences a feeling of strangeness. However, by reducing the suppressed driving force, that is, delaying the timing at which interventional braking control is started, with an increase in the steering angle, it is possible to further reliably reduce a feeling of strangeness experienced by the driver. When the steering angle is large, there are many cases where the driver does not feel the necessity to increase the vehicle speed as an intention. Therefore, driving force suppression control that reduces the suppressed driving force with an increase in the steering angle does not cause the driver to experience a feeling of strangeness.

The driving force suppression control according to the present embodiment is started when an obstacle has been detected by the clearance sonars 201a to 201d. Instead, the driving force suppression control may be started at any timing as long as the timing is earlier than the timing at which interventional braking control is started, and similar operation and advantageous effects are obtained. For example, when an obstacle has been detected and a distance to the obstacle is shorter than or equal to a predetermined distance (the distance to such an extent that interventional braking control is not started), the above-described driving force suppression control may be started.

The embodiments of the invention are described in detail above; however, the invention is not limited to those specific embodiments, and may be modified or changed in various forms within the scope of the invention recited in the appended claims.

For example, in the above-described embodiments, the ultrasonic sensors are used. The invention is also applicable to the case where other means capable of detecting an obstacle (for example, a millimeter wave radar, a laser radar, a stereo camera, or the like). In this case, as in the case of the above-described clearance sonars 201, the number of means arranged for detecting an obstacle is not limited, and an appropriate number of means for detecting an obstacle may be provided so as to be able to detect an obstacle around the host vehicle.

In the above-described embodiments, the clearance sonars 201 are provided outside the vehicle cabin, such as the front bumper, the rear bumper, or the like. Instead, the means for detecting an obstacle may be provided in the vehicle cabin as long as it is possible to detect an obstacle around the host vehicle and detect a distance to the obstacle, or the like. For example, when a stereo camera is used as the means for detecting an obstacle, the stereo camera may be provided near a front windshield, a rear windshield or a side window in the vehicle cabin so as to be able to capture an outdoor image around the host vehicle.

The invention claimed is:

1. A driving assistance apparatus comprising:
    an obstacle detecting unit configured to detect an obstacle and acquire obstacle information including a distance to the obstacle;
    a steering angle detecting unit configured to detect a steering angle of a steering operation by a driver; and
    a control unit configured to intervene to control a braking force on the basis of the distance to the obstacle, based on the obstacle information, and the steering operation by the driver, wherein
    the control unit is further configured to:
    calculate a deceleration for avoiding a collision with the obstacle on the basis of the distance,
    intervene to control the braking force on the basis of the deceleration,
    intervene to control a propulsive driving force by suppressing the propulsive driving force on the basis of the obstacle information at a timing earlier than a timing at which the control unit intervenes to control the braking force, and
    increase an amount, by which the propulsive driving force is suppressed, as the steering angle increases.

2. The driving assistance apparatus according to claim 1, wherein the control unit is further configured to reduce the deceleration as the steering angle of the steering operation by the driver increases.

3. The driving assistance apparatus according to claim 1, wherein the control unit is further configured to intervene to control the braking force when the deceleration is higher than a predetermined value.

4. The driving assistance apparatus according to claim 1, further comprising:
    a vehicle speed detecting unit configured to detect a vehicle speed of a host vehicle; and
    a throttle opening degree detecting unit configured to detect a throttle opening degree.

5. The driving assistance apparatus according to claim 1, wherein the control unit is further configured to intervene to control the propulsive driving force by suppressing the propulsive driving force when the obstacle has been detected by the obstacle detecting unit.

6. A driving assistance apparatus comprising:
    a first sensor configured to detect an obstacle and acquire obstacle information including a distance to the obstacle;
    a second sensor configured to detect a steering angle of the steering operation by a driver; and
    an electronic control unit (ECU) configured to intervene to control a braking force on the basis of the distance to the obstacle, based on the obstacle information, and the steering operation by the driver, wherein
    the ECU is further configured to:
    calculate a deceleration for avoiding a collision with the obstacle on the basis of the distance,
    intervene to control the braking force on the basis of the deceleration,
    intervene to control a propulsive driving force by suppressing the propulsive driving force on the basis of the obstacle information at a timing earlier than a timing at which the control unit intervenes to control the braking force, and
    increase an amount, by which the propulsive driving force is suppressed, as the steering angle increases.

7. The driving assistance apparatus according to claim 6, wherein the ECU is further configured to reduce the deceleration as the steering angle of the steering operation by the driver increases.

8. The driving assistance apparatus according to claim 6, wherein the ECU is further configured to intervene to control the braking force when the deceleration is higher than a predetermined value.

9. The driving assistance apparatus according to claim 6, further comprising:
    a third sensor configured to detect a vehicle speed of a host vehicle; and
    a fourth sensor configured to detect a throttle opening degree.

10. The driving assistance apparatus according to claim 6, wherein the ECU is further configured to intervene to control the propulsive driving force by suppressing the propulsive driving force when the obstacle has been detected by the first sensor.

\* \* \* \* \*